United States Patent
Trewitt

[19]

[11] Patent Number: 6,151,629
[45] Date of Patent: Nov. 21, 2000

[54] TRIGGERED REMOTE DIAL-UP FOR INTERNET ACCESS

[75] Inventor: Glenn Trewitt, Sunnyvale, Calif.

[73] Assignee: Compaq Computer Corporation, Houston, Tex.

[21] Appl. No.: 09/033,183

[22] Filed: Mar. 2, 1998

[51] Int. Cl.[7] ................................................. G06F 15/16
[52] U.S. Cl. ..................... 709/227; 709/225; 709/228; 709/238
[58] Field of Search ................................. 709/228, 238, 709/225, 227

[56] References Cited

U.S. PATENT DOCUMENTS

| | | | |
|---|---|---|---|
| 5,745,884 | 4/1998 | Carnegie et al. | 709/228 |
| 5,793,763 | 8/1998 | Mayes et al. | 709/238 |
| 5,845,267 | 12/1998 | Ronen | 709/238 |
| 5,867,495 | 2/1999 | Elliott et al. | 709/238 |
| 5,898,780 | 4/1999 | Liu et al. | 709/238 |
| 5,918,019 | 6/1999 | Valencia | 709/238 |

*Primary Examiner*—Zarni Maung
*Assistant Examiner*—Farzaneh Farahi
*Attorney, Agent, or Firm*—Fenwick & West LLP

[57] ABSTRACT

A computerized method is provided for connecting a remote computer to a local area network (LAN) via the Internet. An identification is sent to a gateway of a local area network using a publicly accessible communications network, either by a user or by a modem of the remote computer. The gateway uses the sent identification to index a database and read a profile record specifying an Internet Service Provider. The gateway makes a request of the specified Internet Service Provider to assign an IP address. Upon receiving the assigned IP address, the gateway sends a mail message including the Internet address to a mailbox at a mailbox address specified in the indexed profile record. The user of the remote computer reads the mail message to obtain the IP address, and the dynamically assigned IP address can then be used to connect the remote computer to a local area network (LAN) via the Internet.

19 Claims, 2 Drawing Sheets

TRIGGERED REMOTE DIAL-UP FOR INTERNET ACCESS

FIELD OF THE INVENTION

This invention relates generally to data communication, and more particularly to accessing a Local Area Network (LAN) from a computer at a remote location on demand via the Internet.

BACKGROUND OF THE INVENTION

The Internet, a wide area network (WAN), connects networks all over the world. Many of the connected networks are local area networks (LAN). A LAN can include multiple "local" computer systems, for example, client and server computers. The clients can be personal computers, workstations, portables, and the like, the servers are usually larger systems. Typically, the LAN is connected to the Internet via a "gateway." A gateway serves as a juncture at the symmetric boundary between two Internet networks.

The gateway is usually configured with hardware and software that can process communication messages according to the Internet Protocol (IP) using a TCP/IP stack. The gateway can be part of a dedicated computer system, or part of a system that also performs other functions.

When one of the local computers desires to communicate via the Internet, an Internet connection is usually initiated by either the LAN or the gateway on behalf of the local computer. Communication messages can then be exchanged using IP messages. Each IP message has a source address of the sending computer, and a destination address of the receiving computer. These addresses are known as IP addresses. In order to conduct Internet communications, it is essential that the IP addresses are known beforehand.

In the past, Internet-connected LANs have generally been operated by corporations, governments, educational institutions, or other enterprises. These larger entities usually have a permanent connection to an Internet Service Provider (ISP) and an associated permanently-assigned block of IP addresses. Having permanent IP addresses makes it possible for other systems to communicate with these entities.

However, more recently, computer devices are starting to be used outside of their traditional settings, for example, in homes, schools, and small businesses. In many of these settings, the devices may be connected by a LAN. Users of the devices on the LAN would like the LAN to be connected to the Internet, particularly when they are remote from the LAN. Unfortunately, users are only connected when the LAN needs Internet services, and each time a connection is made between the LAN and the Internet the assigned IP address changes.

However, unlike the larger entities, these more casual users will often choose a less expensive ISP connection, typically using a dial-in modem, or some other mechanism that is only connected to the ISP when needed. This creates a problem for remote users who want to access Internet resources, e.g., users who are away from home or school so that the LAN is not directly accessible.

There is no guarantee that the connection between the LAN and and the ISP will be "up" to allow Internet access to the LAN by the remote user, and even if the connection is up, there is no easy way for the remote user to determine what the current IP address the ISP has assigned. If there is no connection, then there is no way for the remote user to iniate the connection because for various reasons, most ISPs are unwilling or unable to permanently assign IP addresses to casual "dial-up" users, which would be required for the remote user to know what address to send to. Second, ISPs generally do not want to assume the cost for dialing the gateway.

Even if there was a way to initiate the connection, there is no way to determine the IP address that is dynamically assigned by the ISP because a different IP address would be assigned each time an IP connection is requested. These problems are common across the ISP industry.

Therefore, there is a need to allow a remote computer to cause a LAN to initiate an Internet connection with an ISP using dial-up capabilities on demand, and for the remote computer to determine the assigned IP address.

SUMMARY OF THE INVENTION

Provided is a method and apparatus for connecting a remote computer to a Local Area Network (LAN) on demand via the Internet. The user of the remote computer is in possession of a personal identification number, i.e., a PIN and the telephone number of a gateway to a LAN. The user uses a publicly accessible communications network to send the PIN to the gateway. The user can call the gateway directly with a telephone, or the PIN can be sent to the gateway via a modem of the remote computer.

The gateway uses the sent identification to index a database and read a profile record specifying an Internet Provider. The gateway make a request of the specified Internet Service Provider to assign an IP address.

Upon receiving the assigned IP address, the gateway sends a mail message including the Internet address to a mailbox at a mailbox address specified in the indexed profile record.

The user of the remote computer reads the mail message using electronic mail software of the remote computer to obtain the IP address. The mail can be stored in an electronic mailbox with the ISP, or elsewhere. The IP address can then be used by the user to dynamically connect the remote computer to LAN via the Internet.

DETAILED DESCRIPTION OF PREFERRED EMBODIMENTS

Figure 1:
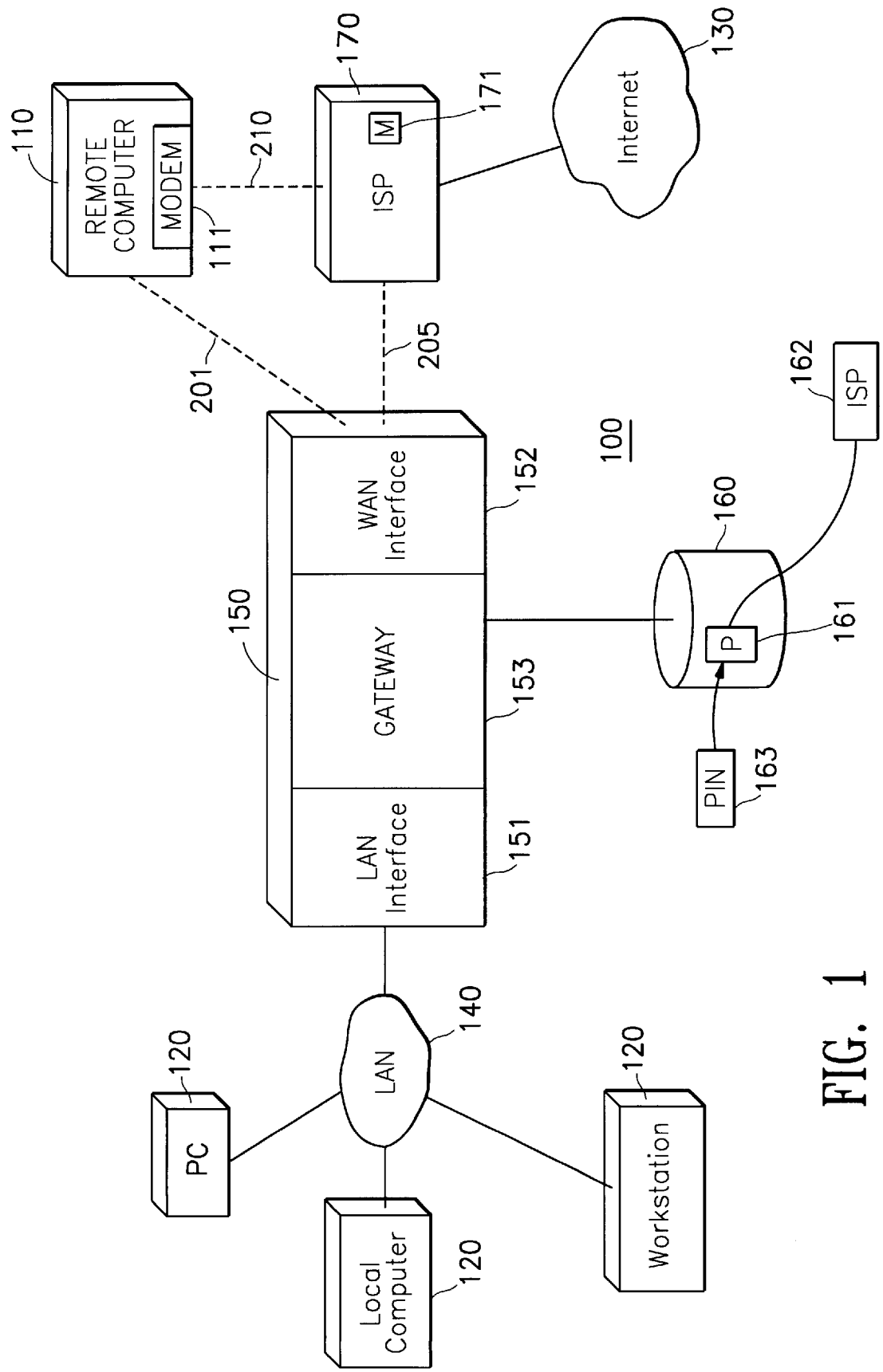
FIG. 1 is a block diagram of a network incorporating the invention.

FIG. 1 shows an arrangement 100 according to the invention that allows a computer 110 to have Internet access from any remote location. The arrangement includes local computers 120 connected by a local area network (LAN) 140. A gateway 150 can be connected to the Internet 130 via an Internet Service Providers (ISP) 170.

In the preferred embodiment, the remote computer 110 is a portable computer, such as a laptop or personal digital assistant (PDA) that can be used at many different locations. The remote computer 110 is equipped with a modem 111 for communicating using public communication services, for example, land lines, or cellular channels.

The local computers 120, for example, PCS, workstations, are generally conventional and interconnected as a local area network 140. The Internet 130 uses the Internet Protocol (IP). As part of the protocol, communication messages are exchanged using source and destination IP addresses.

A gateway 150 provides a communication interface between the Internet 130 and the LAN 140. The gateway includes a LAN interface 151 and a WAN interface 152. The LAN interface 151 can be an Ethernet of various types, a token ring, an FDDI, an infrared LAN, or a CEBUS™ interface to a power line network, or other LAN interfaces. The WAN interface 152 can be a modem to interface to a plain old telephone service (POTS), ISDN, 56 Kilobit AND, ADSL, T1, cable modem, or a fiber-optic link, for example.

The gateway 150 also includes hardware and software 153, and data structures 160 according to the invention. The data structures 160 includes records (P) 161 that can be stored in a memory accessible by the gateway 150. Each record 161 stores a list of one or more pre-configured profiles 162 of how to interact the various ISPs. For example, the type of WAN interface to use. In addition, the profiles can include the "dial-up" numbers of the ISPs, user names, and associated passwords. The profiles can also specify the information necessary for accessing electronic mail boxes, for example, host names, user names, and passwords.

The records can be indexed by a personal identification number (PIN) 163, or some other type of password. Indexing the records 161 by a PIN 162 produces the list of associated ISP profiles 162. The use of the records 161 in accordance with the invention is described in greater detail below.

Figure 2:
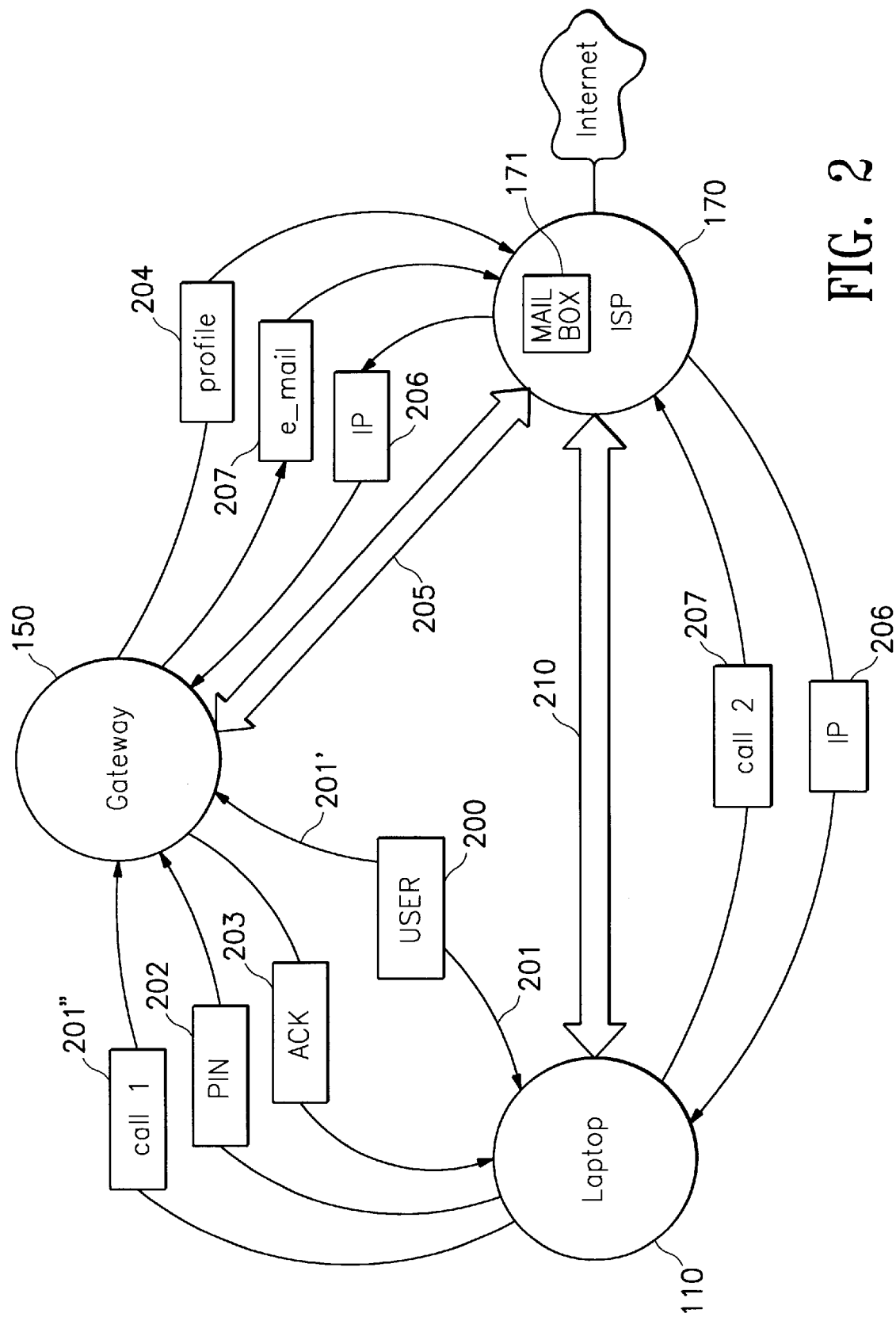
FIG. 2 is a flow diagram of communication transaction implemented according to a preferred embodiment of the invention.

FIG. 2 illustrates the operation of the invention. A user 200 of the remote computer 110, e.g., a laptop, or the computer itself is provided with the telephone number of the gateway 150 and one of the PINs, i.e., PIN 202. The user places a call to the gateway 150 using the known telephone number. The user can call the ISP directly with a telephone via line 201', or the user can direct the laptop 110 to make the call via the modem 111 (call 1 201").

In response to the gateway 150 accepting the call 201 placed in either manner, the PIN 202 is sent to the gateway. If the call is made by the user, the PIN can be entered using the keypad of the telephone, otherwise the PIN 202 is sent by the laptop 110. The gateway, upon receipt of the PIN, indexes the profile records 161 accordingly. If the PIN is recognized, the gateway 150 can acknowledge (ACK) 203.

The ACK 203 may include a further interchange between the user or the laptop 110 and the gateway, when the indexed record specifies multiple ISPs, and the user may want to make an ISP choice depending on the remote location. The selection can be made by using the telephone keypad, or the laptop. In any case, a particular ISP is selected. At this point, the connection 201 to the gateway 150 can be terminated.

The gateway 150 uses the selected profile information 204 of the indexed record to make an IP connection 205 with the chosen ISP 170. In response, the gateway 150 receives an IP address 206 from the ISP. The gateway passes the IP address 206 assigned by the ISP to a mailbox 171 at a pre-specified address in an electronic mail (e-mail) message 207. The e-mail address can be obtained from the profile record. The IP address 206 can be included in the "subject" portion of the electronic mail message 207. These communication interactions between the user and the gateway, and between the gateway and the selected ISP can be completed in a short time.

After the mail message 207 has been sent to the mailbox 171, perhaps at the ISP, or elsewhere, the user can then take whatever action is required to read the mail message 207 to obtain the assigned IP address 206. For example, the user can call the ISP 170 using the laptop 110 and read the mailbox 171 using electronic mail software to learn the assigned IP address 206. The laptop 110 can use the IP address 206 to establish a connection 210 with the LAN 140. The laptop can communicate over this connection using standard Internet protocols, for example, POP or IMAP.

It should be understood that user or laptop must be in possession of the numbers of the gateway 150 and the ISP 170, and the PIN 202, and whatever information is necessary to access the mailbox 171, for example, a host name, a user name, and a password.

As a result of the above steps, the invention achieves the desired goal of connecting a remote computer to the Internet using a dynamically assigned IP address.

It is understood that the above-described embodiments are simply illustrative of the principles of the invention. Various other modifications and changes may be made by those skilled in the art which will embody the principles of the invention and fall within the spirit and scope thereof.

I claim:

1. A computerized method for connecting a remote computer to a local area network over the Internet, comprising the steps of:

responsive to telephonically receiving identification information, indexing a database of a gateway of the local area network by the identification to read a profile record specifying an Internet Service Provider;

connecting the gateway to the specified Internet Service Provider;

receiving an IP address assignment from the specified Internet Service Provider;

sending a mail message including the IP address assigned by the Internet Service Provider to a mailbox at a mailbox address specified in the indexed profile record;

reading the mail message by the remote computer to obtain the IP address; and connecting the remote computer to the local area network via the Internet and using the assigned IP address.

2. The method of claim 1 wherein a user sends the identification to the gateway using a telephone line and a known telephone number.

3. The method of claim 1 wherein a modem of the remote computer sends the identification to the gateway using a telephone line and a known telephone number.

4. The method of claim 1 wherein the indexed record specifies a plurality of Internet Service Providers, and the user selects a particular Internet Service Provider.

5. The method of claim 1 wherein the mailbox address is specified by a host name, a user name, and a password.

6. The method of claim 1 wherein the remote computer is a portable computer that can be used at multiple remote locations.

7. The method of claim 1 wherein the Internet connection is made via the specified Internet Service Provider.

8. An apparatus for connecting a remote computer to a local area network via the Internet, comprising:

means for telephonically sending an identification to a gateway of the local area network using a publicly accessible communications network;

means for indexing a database of the gateway by the identification to read a profile record specifying an Internet Service Provider and a mailbox address;

means for connecting the gateway to the specified Internet Service Provider;

means for requesting an IP address from the specified Internet Service Provider;

a mailbox at the mailbox address for receiving a mail message including the requested IP address assigned by the Internet Service Provider;

means for reading the mail message by the remote computer to obtain the IP address; and means for connecting the remote computer to the local area network via the Internet and using the dynamically assigned IP address.

9. The apparatus of claim 8 wherein the means for telephonically sending is a telephone.

10. The apparatus of claim 8 wherein the means for telephonically sending is a modem of the remote computer.

11. The apparatus of claim 8 wherein the database is stored in a memory accessible by the gateway, and the indexed record specifies a plurality of Internet Service Providers, and means for selecting a particular Internet Service Provider.

12. The apparatus of claim 8 wherein the mailbox address is specified by a host name, a user name, and a password.

13. The apparatus of claim 8 wherein the remote computer is a portable computer that can be used at multiple remote locations.

14. The computerized method of claim 1 further comprising:

responsive to the request for an IP address, dynamically assigning an IP address to the gateway of the local area network.

15. A computerized method for connecting a local computer to a remote computer over a global communications network, comprising the steps of:

responsive to telephonically receiving identification information, indexing a database of the local computer by the identification to read a profile record specifying an network service provider;

connecting the local computer to the specified network service provider;

receiving assignment of a network address from the specified network service provider;

sending a message including the network address assigned by the network service provider to an address specified in the indexed profile record; and responsive to the local computer receiving a connection request from the remote computer:
establishing a connection between the local computer and the remote computer over the global communications network.

16. The computerized method of claim 15, further including the steps of:

reading the mail message by the remote computer to obtain the network address assigned to the local computer; and sending a connection request from the remote computer to the local computer via the global communications network and using the assigned network address.

17. An apparatus for connecting a remote computer to a local computer via the Internet, comprising:

means for telephonically receiving an identification at the local computer;

means for indexing a database of the local computer by the identification to read a profile record specifying an Internet Service Provider and a mailbox address;

means for connecting the local computer to the specified Internet Service Provider;

means for receiving assignment of an IP address from the specified Internet Service Provider;

means for transmitting the assigned IP address to the specified mailbox address;

means for the local computer receiving a connection request from the remote computer; and means for establishing a connection from the local computer to the remote computer responsive to receiving the connection request.

18. The apparatus of claim 17, further comprising means for reading the mail message by the remote computer to obtain the assigned IP address.

19. A computer program product stored on a computer readable medium for connecting a local computer to a remote computer, the computer program product controlling a processor coupled to the medium to perform the operations of:

responsive to telephonically receiving identification information, indexing a database of the local computer by the identification to read a profile record specifying an Internet Service Provider;

connecting the local computer to he specified Internet Service Provider;

receiving assignment of an IP address from the specified Internet Service Provider;

sending a mail message including the IP address assigned by the Internet Service Provider to a mailbox at a mailbox address specified in the indexed profile record; and responsive to the local computer receiving a connection request from the remote computer:
establishing a connection between the local computer and the remote computer over the Internet.

* * * * *